United States Patent

Matsumoto et al.

[11] Patent Number: 5,920,603
[45] Date of Patent: Jul. 6, 1999

[54] FORGED CORE PLATE FOR A BOILING WATER REACTOR

[75] Inventors: Jack T. Matsumoto, Sunnyvale; Alex B. Fife, San Jose, both of Calif.

[73] Assignee: General Electric Company, Schenectady, N.Y.

[21] Appl. No.: 09/016,903

[22] Filed: Feb. 2, 1998

Related U.S. Application Data

[60] Provisional application No. 60/058,017, Aug. 29, 1997.

[51] Int. Cl.[6] .................................................. G21C 15/00
[52] U.S. Cl. ............................................ 376/362; 376/352
[58] Field of Search .................................... 376/302, 347, 376/352, 353, 362, 461

[56] References Cited

U.S. PATENT DOCUMENTS 3,996,102  12/1976  Thome ..................................... 376/362
4,142,936  3/1979  Steinkamp et al. ..................... 376/362

*Primary Examiner*—Daniel D. Wasil
*Attorney, Agent, or Firm*—Armstrong Teasdale LLP

[57] ABSTRACT

A forged core plate fabricated from a single piece stainless steel forging is described. The plate has a substantially circular shape and penetrations are provided in the core plate to allow passage of control rod blades into the core and direct recirculation flow past the fuel assemblies. The penetrations are formed from machining "5 holes" per penetration. Particularly, each penetration includes a center through hole to allow passage of the control rod blade and control rod blade guide tube. The through hole has a smaller diameter at the plate top surface to provide a tighter fit to the outside diameter of the guide tube to maintain alignment and minimize flow leakage. The through hole is enlarged at the core plate bottom surface to allow clearance in order to improve the installation and removal of the guide tube. Each penetration also include four peripheral blind holes to direct the recirculation flow into the flow holes located on the sides of the guide tube. The blind holes do not extend completely through the plate. When the guide tube is installed in the core plate, the flow holes in the side of the guide tube is located approximately ⅓ of the way down from the plate top surface.

14 Claims, 3 Drawing Sheets

FORGED CORE PLATE FOR A BOILING WATER REACTOR

CROSS REFERENCE TO RELATED APPLICATION

This application claims the benefit of U.S. Provisional Application Ser. No. 60/058,017, filed Aug. 29, 1997.

FIELD OF THE INVENTION

This invention relates generally to boiling water reactors and more particularly, to a forged core plate for such a reactor.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds both the core plate and the top guide. The top guide includes several openings, and fuel bundles are inserted through the openings and are supported by the core plate.

Known core plates are fabricated from several stainless steel plates and formed ring segments joined together by welding. A typical core plate has over 200 welds. Fabricating such a core plate is very labor intensive. In addition, maintaining the required core plate geometry is difficult because of weld distortion and tolerance stack-ups between the several plates and ring segments.

The core plate welds also, increase the susceptibility of the core plate material to a detrimental effect known as inter-granular stress corrosion cracking (IGSCC). Although no cracking currently is known to be occurring in a core plate, cracking may occur in the heat affected zone of the welds. Eliminating welds in the core plate therefore would eliminate the potential of cracks initiating in welds.

SUMMARY OF THE INVENTION

These and other objects may be attained by a forged core plate fabricated from a single piece stainless steel forging. The plate has a substantially circular shape and penetrations are provided in the core plate to allow passage of control rod blades into the core and direct recirculation flow past the fuel assemblies. The penetrations are formed from machining "5 holes" per penetration. Particularly, each penetration includes a center through hole to allow passage of the control rod blade and control rod blade guide tube. The through hole has a smaller diameter at the plate top surface to provide a tighter fit to the outside diameter of the guide tube to maintain alignment and minimize flow leakage. The through hole is enlarged at the core plate bottom surface to allow clearance in order to improve the installation and removal of the guide tube.

Each penetration also includes four peripheral blind holes to direct the recirculation flow into the flow holes located on the sides of the guide tube. The blind holes do not extend completely through the plate. When the guide tube is installed in the core plate, the flow holes in the side of the guide tube are located approximately ⅓ of the way down from the plate top surface.

The above described core plate enables the elimination of welds, minimizes the size of the forging required for fabrication, provides all the same flow paths as provided with known core plates, and has improved the producibility. Specifically, all welds in the core plate are eliminated, which eliminates the possibility of cracking in the heat affected zone of welds. Further, no welds need to be inspected during manufacturing and during service life. Eliminating welding also eliminates weld distortion and thus improves producibility. The single piece construction also eliminates fit-up requirements and thus improves producibility.

In addition, the five hole pattern is the same for all central fuel support locations. This pattern provides structural webs on four sides of the fuel support location, which minimizes the required depth of the core plate. Core plates fabricated by welding together plates have structural webs on only one or two sides of each fuel support location. Also, all flow paths through the core plate to the fuel are the same, which standardizes the fuel orifice design. Core plates fabricated by welding together plates have two or three different flow paths at each fuel support location. Also, the 5 hole configuration can be machined by drilling rather than my milling, which improves producibility. The 5 hole configuration also improves producibility by eliminating small fillet radii.

DETAILED DESCRIPTION

Figure 1:
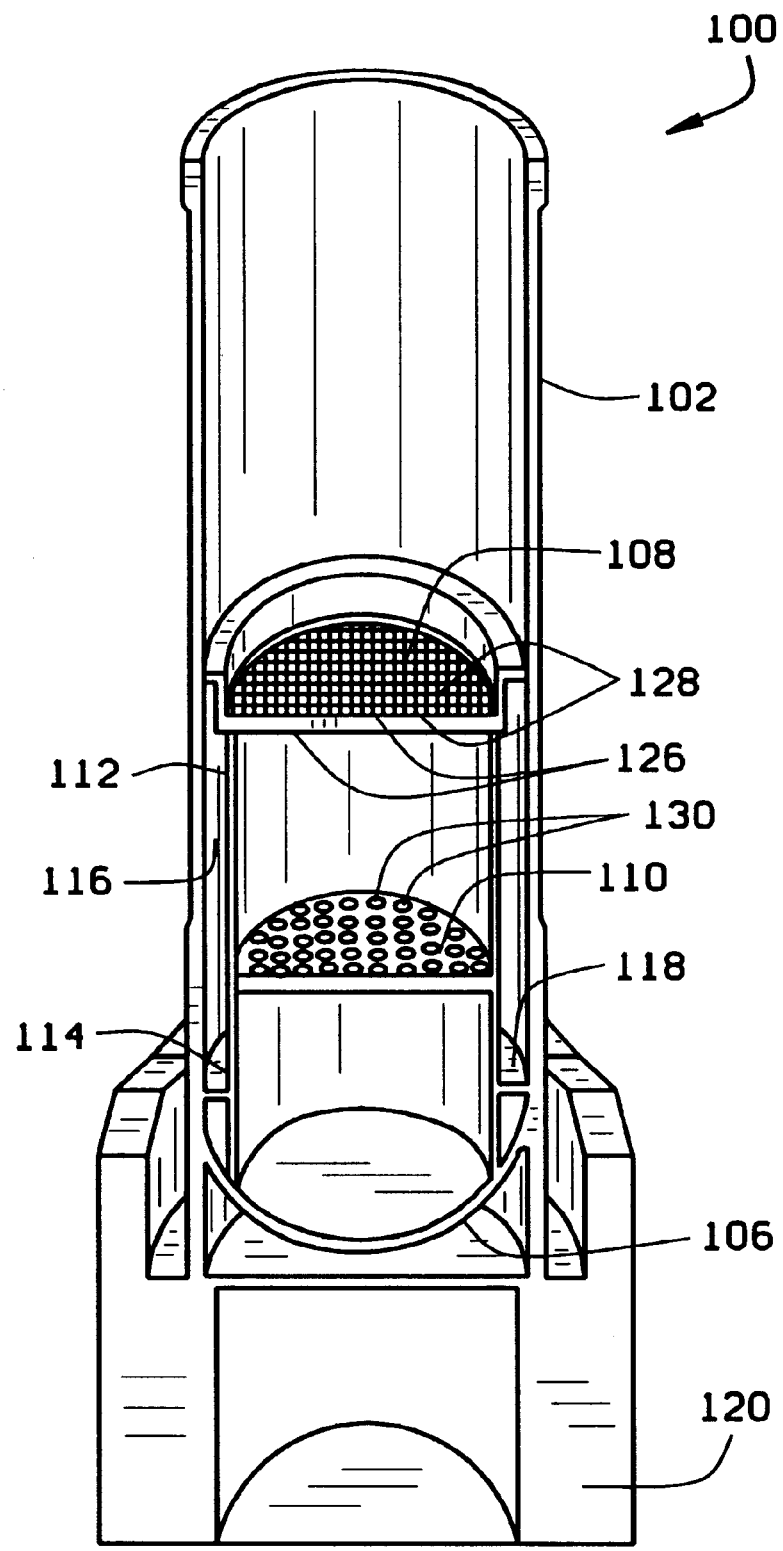
FIG. 1 is a schematic, partial cross section, illustration of a boiling water reactor.

FIG. 1 is a schematic, partial cross section, illustration of a boiling water reactor 100 including a reactor pressure vessel (RPV) 102. RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102. RPV 102, of course, is filled with water.

RPV 102 is shown in FIG. 1 as being shut down with many components removed. For example, and in operation, many fuel bundles and control rods (not shown) are located in the area between top guide 108 and core plate 110. In addition, and in operation, steam separators and dryers and many other components (not shown) are located in the area above top guide 108.

Top guide 108 is a latticed structure including several top guide beams 126 defining top guide openings 128. Core plate 110 includes several recessed surfaces 130 which are substantially aligned with top guide openings 128 to facilitate positioning the fuel bundles between top guide 108 and core plate 110. Fuel bundles are inserted into the area between top guide 108 and core plate 110 by utilizing top guide openings 128 and recessed surfaces 130. Particularly, each fuel bundle is inserted through a top guide opening 128, and is supported horizontally by core plate 110 and top guide beams 126. The fuel is supported vertically by the control rod guide tube which passes through opening 130 in the core plate.

Figure 2:
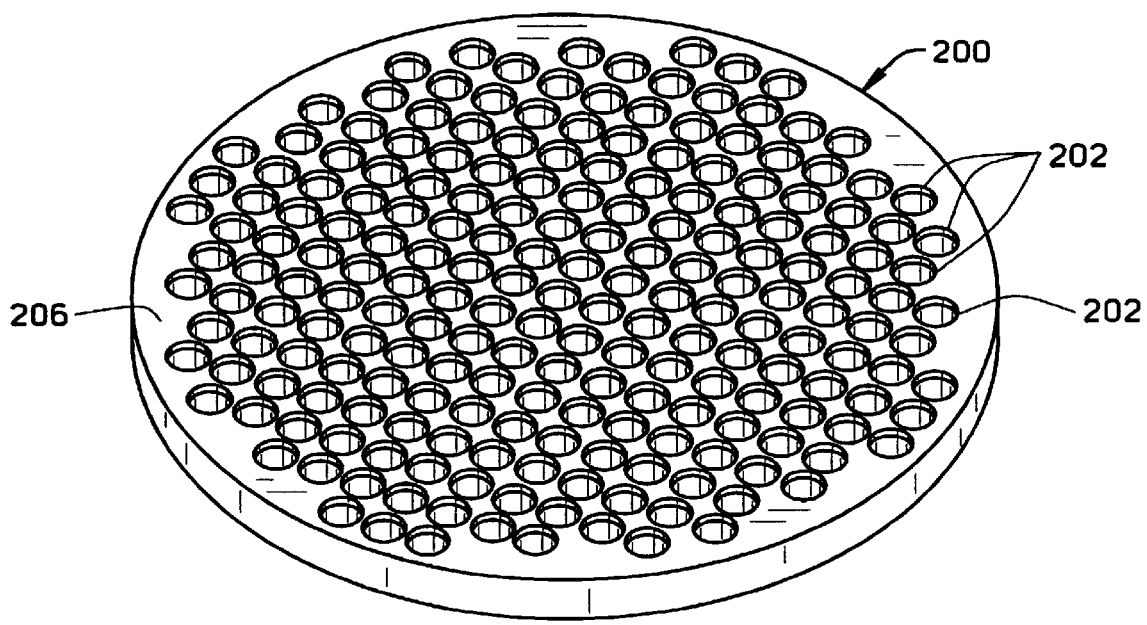
FIG. 2 is a perspective top view of a forged core plate in accordance with one embodiment of the present invention.

FIG. 2 is a perspective top view of a forged core plate 200 in accordance with one embodiment of the present invention. Core plate 200 is fabricated from metal and supports the fuel assemblies in a BWR. Core plate 200 also functions as a baffle plate to direct recirculation water within the shroud. The primary load on plate 200 is due to the differential pressure drop across plate 200 caused by the restriction of the recirculation flow.

In accordance with the present invention, core plate 200 is fabricated from a single piece stainless steel forging. Plate 200 has a substantially circular shape and penetrations 202 are required in core plate 200 to allow passage of control rod blades into the core and direct recirculation flow past the fuel assemblies. The control rod blades are cruciform in shape and are housed within a cylindrical guide tube which must pass through core plate penetrations 202 from above.

Figure 3:
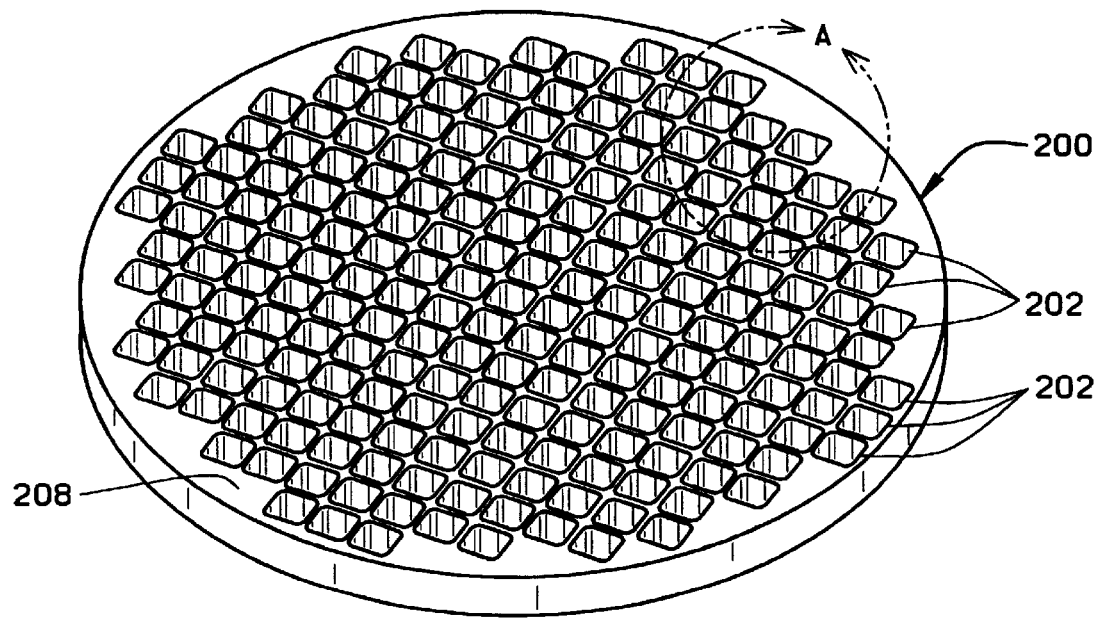
FIG. 3 is a perspective bottom view of the core plate shown in FIG. 2.

FIG. 3 is a perspective bottom view of core plate 200. As shown in FIG. 3, each penetration 202 has a different geometric shape at its lower end than at its top end.

Figure 4:
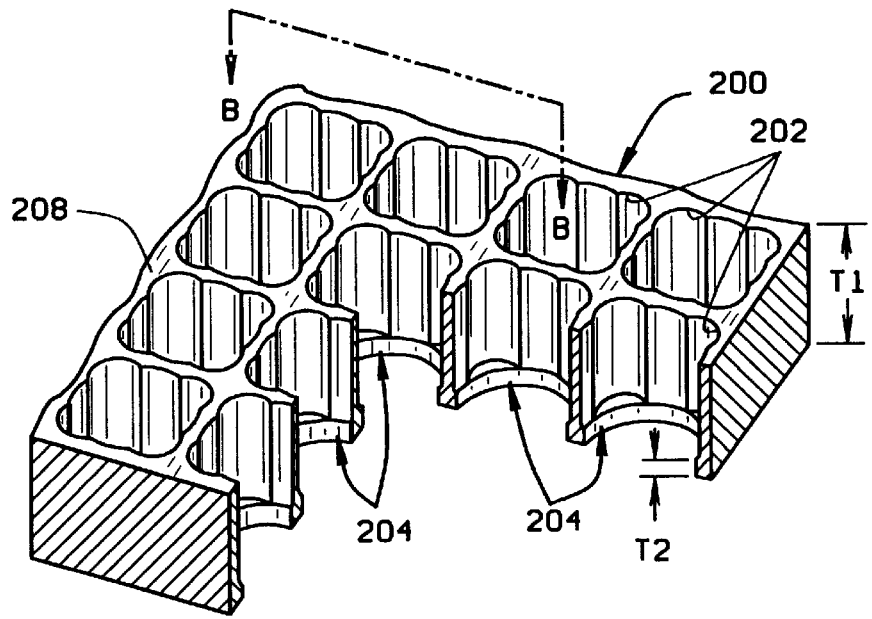
FIG. 4 is a perspective view of a portion of the core plate shown in FIG. 2.
Figure 5:
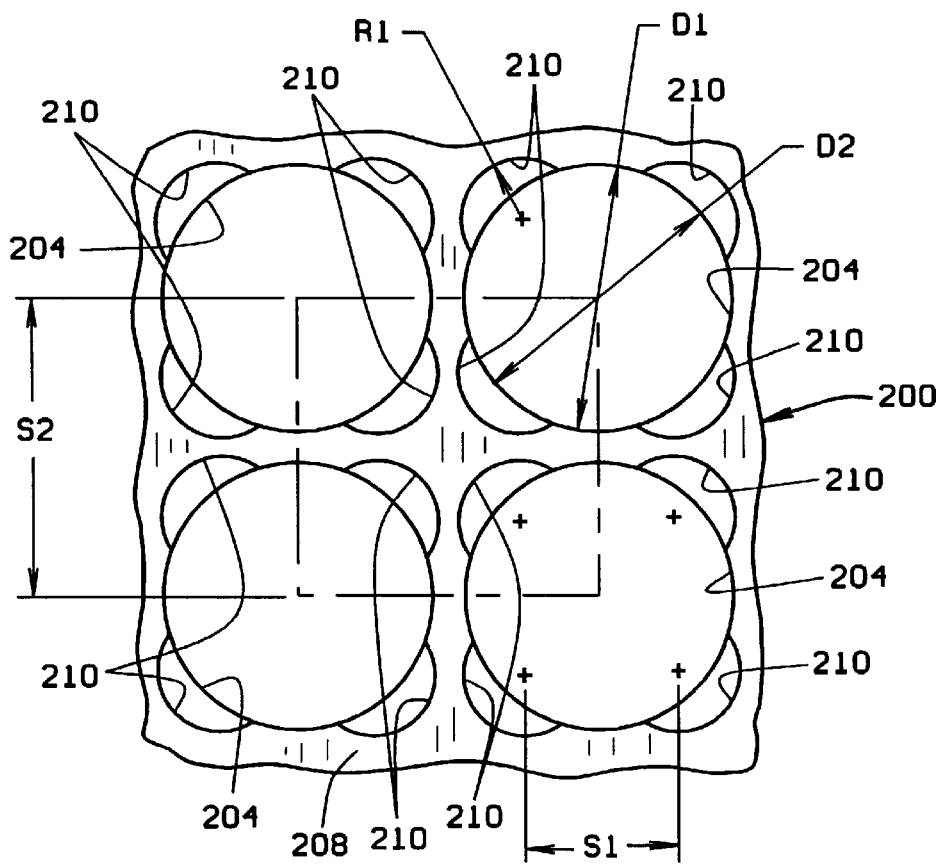
FIG. 5 is a view of a section of the core plate through line B—B shown in FIG. 4.

More particularly, and referring to FIGS. 4 and 5 which are a perspective view of a portion of core plate within circle A shown in FIG. 3 and a view of a section of the core plate through line B—B shown in FIG. 4, respectively, penetrations 202 are formed from machining "5 holes" per penetration 202. A center through hole 204 is required to allow passage of the control rod blade and control rod blade guide tube through penetrations 202. Through hole 204 has a smaller diameter at a top surface 206 (FIG. 2) of plate 200 to provide a tighter fit to the outside diameter of the guide tube to maintain alignment and minimize flow leakage. Through hole 204 is enlarged at a bottom surface 208 of plate 200 to allow clearance in order to improve the installation and removal of the guide tube.

Four peripheral blind holes 210 are provided to direct the recirculation flow into the flow holes located on the sides of the guide tube. Blind holes 210 do not extend completely through plate 200 as clearly shown in FIGS. 4 and 5. When the guide tube is installed in the core plate, the flow holes in the side of the guide tube is located approximately ⅓ of the way down from top surface 206 of core plate 200.

Thickness T1 of core plate 200 is selected to carry vertical loads. Under normal operation, core plate 200 will be subjected to a upward pressure load. During an emergency condition, core plate 200 may also be required to carry a downward load from some of the fuel assemblies. Under this loading condition, however, the loads are less than the pressure loads. Thus, the thickness of core plate 200 is selected to carry the pressure load.

Referring specifically to FIG. 4, and in one specific embodiment, thickness T1 is 325 mm and thickness T2 is 50.8 mm. In this embodiment, blind holes 210 have a radius R1 of 64 mm and extend 274.2 mm from bottom surface 208 toward top surface 206. The centers of blind holes 210 are spaced S1 about 156.6 mm. Through holes 204 have a diameter D1 of about 284.5 mm for a depth of about 274.2 mm from bottom surface 208 toward top surface 206, then from 274.2 mm to completely through top surface 206, through holes 204 have a diameter D2 of 276.2 mm. The centers of through holes 204 are spaced S2 about 309.9 mm.

The above described core plate enables the elimination of welds, minimizes the size of the forging required for fabrication, provides the same flow paths to all central fuel assemblies, and has improved the producibility. Specifically, all welds in the core plate are eliminated, which eliminates the possibility of cracking in the heat affected zone of welds. Further, no welds need to be inspected during manufacturing and during service life. Eliminating welding also eliminates weld distortion and thus improves producibility. The single piece construction also eliminates fit-up requirements and thus improves producibility.

In addition, the five hole pattern is the same for all central fuel support locations. This pattern provides structural webs on four sides of the fuel support location, which minimizes the required depth of the core plate. Also, all flow paths through the core plate to the fuel are the same, which standardizes the fuel orifice design. Also, the 5 hole configuration can be machined by drilling rather than my milling, which improves producibility. The 5 hole configuration also improves producibility by eliminating small fillet radii.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A core plate for a boiling water nuclear reactor, said core plate comprising a plurality of penetrations therein, each of said penetrations comprising a through hole and a plurality of blind holes.

2. A core plate in accordance with claim 1 wherein said core plate is fabricated from a single piece stainless steel forging.

3. A core plate in accordance with claim 1 wherein said plate has a substantially circular shape.

4. A core plate in accordance with claim 1 wherein said through hole has a smaller diameter at a top surface of said plate as compared to said through hole diameter at a bottom surface of said plate.

5. A core plate in accordance with claim 1 wherein said through hole is enlarged at a bottom surface of said plate.

6. A core plate in accordance with claim 1 wherein said penetration comprises four blind holes.

7. A core plate in accordance with claim 1 wherein said blind holes do not extend completely through said plate .

8. A core plate in accordance with claim 1 wherein a thickness of said core plate is selected to carry vertical loads.

9. A core plate for a boiling water nuclear reactor, said core plate comprising a plurality of penetrations therein, each of said penetrations comprising a through hole and four blind holes, said through hole enlarged at a bottom surface of said plate.

10. A core plate in accordance with claim 9 wherein said core plate is fabricated from a single piece stainless steel forging.

11. A core plate in accordance with claim 9 wherein said plate has a substantially circular shape.

12. A core plate in accordance with claim 9 wherein said through hole has a smaller diameter at a top surface of said plate as compared to said through hole diameter at a bottom surface of said plate.

13. A core plate in accordance with claim 9 wherein said blind holes do not extend completely through said plate.

14. A core plate in accordance with claim 9 wherein a thickness of said core plate is selected to carry vertical loads.

* * * * *